United States Patent
Brasheurs et al.

[11] Patent Number: 5,548,545
[45] Date of Patent: Aug. 20, 1996

[54] FLOATING POINT EXCEPTION PREDICTION FOR COMPOUND OPERATIONS AND VARIABLE PRECISION USING AN INTERMEDIATE EXPONENT BUS

[75] Inventors: Cheryl S. Brashears, Cupertino; James S. Blomgren, San Jose, both of Calif.

[73] Assignee: Exponential Technology, Inc., San Jose, Calif.

[21] Appl. No.: 375,352

[22] Filed: Jan. 19, 1995

[51] Int. Cl.⁶ .................................................. G06F 7/38
[52] U.S. Cl. ............................ 364/748; 364/745
[58] Field of Search ................................ 364/748, 745, 364/736.5

[56] References Cited

U.S. PATENT DOCUMENTS

| | | | |
|---|---|---|---|
| 4,707,783 | 11/1987 | Lee et al. | 364/200 |
| 4,773,035 | 9/1988 | Lee et al. | 364/748 |
| 4,800,516 | 1/1989 | Si et al. | 364/748 |
| 4,879,676 | 11/1989 | Hansen | 364/748 |
| 5,038,313 | 8/1991 | Kojima | 364/748 |
| 5,134,693 | 7/1992 | Saini | 395/375 |
| 5,257,216 | 10/1993 | Sweedler | 364/748 |
| 5,307,301 | 4/1994 | Sweedler | 364/748 |
| 5,341,320 | 8/1994 | Trissel et al. | 364/748 |
| 5,373,461 | 12/1994 | Bearden et al. | 364/748 |
| 5,408,427 | 4/1995 | Einaj et al. | 364/748 |

*Primary Examiner*—David H. Malzahn
*Attorney, Agent, or Firm*—Stuart T. Auvinen

[57] ABSTRACT

Exponents are first combined together, in a way that varies with the type of floating point operation. A single intermediate exponent result is placed on an intermediate exponent bus. This intermediate exponent is adjusted upwards for any carry-out from the operation on the mantissas, or downwards for any cancellation of leading mantissa bits, producing the final exponent result. The intermediate exponent on the intermediate exponent bus is also compared to a single criteria which is used for all types of floating point operations. Thus the compare logic may be simplified because only a single set of criteria is used for all types of operations. Alternately, the criteria may be varied depending upon the degree of precision used by all operations. Because the intermediate exponent is used, separate exponent adders are not necessary for the prediction unit and the floating point unit. Compound floating point operations may require more complex logic for combining the exponents. The more complex logic is needed to calculate the exponent for the result, so again no additional logic is needed for prediction. Only a single exponent is outputted to the intermediate exponent bus. Thus compound floating point operations may be accommodated simply with the modifications needed for the exponent combination logic.

17 Claims, 6 Drawing Sheets

FLOATING POINT EXCEPTION PREDICTION FOR COMPOUND OPERATIONS AND VARIABLE PRECISION USING AN INTERMEDIATE EXPONENT BUS

BACKGROUND OF THE INVENTION—FIELD OF THE INVENTION

This invention relates to error prediction in a numerical processor, and more particularly to using an intermediate exponent result for prediction of complex operations with variable precision.

BACKGROUND OF THE INVENTION—DESCRIPTION OF THE RELATED ART

Floating point operations typically require multiple clock cycles to complete due to their complexity. Should an error occur as a result of the floating point operation, processing must be halted before the next instruction is processed. Most processors today are highly pipelined such that several instructions are processed simultaneously. Halting execution at the end of the floating point operation is particularly difficult when the processor is pipelined because other instructions have advanced through part of the pipeline. Instructions following the floating point instruction can finish execution before the floating point instruction because of the relatively longer time to execute the floating point instruction.

A primitive solution was to halt all other instructions while the floating point operation was in progress. However, this lowers performance. Early Prediction of the possibility of an error occurring can allow other pipelined instructions to continue when there is no possibility of a floating point error occurring. When prediction signals the possibility of an error, the processor's pipelines are halted until the floating point operation is completed and it is known with certainty that a floating point error has occurred.

The most important and difficult floating point errors to predict are overflow and underflow. Overflow occurs when the result of a floating point operation exceeds the largest number that can be represented within the finite range of a computer's number system. Likewise, underflow occurs when the result is so small that it cannot accurately be represented in the number system of the computer system. Since the range of a number is determined mostly by the exponent rather than by the mantissa, the exponents can be used independently of the mantissa to predict whether an overflow or underflow will occur. Typically, a separate prediction unit is included with the floating point processor.

Hansen, in U.S. Pat. No. 4,879,676, uses a prediction apparatus that combines two exponent values and then compares the result to a predetermined criteria, such as the numerical range with a guardband to account for possible overflow/underflow of the mantissas. For addition and subtraction, he compares the two exponents to the criteria graphed in FIG. 1, which predicts an error when either exponent is equal to the maximum or minimum exponent values representable. Thus the safe region for addition 10 is shaded in FIG. 1, and is only slightly smaller than the total range of exponents 12. For multiplication and division, Hansen first combines (adds or subtracts) the two exponents together, then compares the result to the multiply/divide criteria. FIG. 2 graphically indicates with shading the safe region for multiply and divide 14. For multiply, an error is predicted when the sum of the exponents is equal to or exceeds the maximum exponent representable, the unshaded region above and to the right of line 13. An error will also be indicated if the sum of the exponents is smaller than the smallest exponent representable, the unshaded region below line 11. Thus Hansen combines exponents, but then compares the combined result to criteria that vary with the type of floating point operation.

Sweedler, U.S. Pat. No. 5,257,216, attempts to overcome the problem Hansen has of the time delay when combining exponents. Sweedler uses fixed criteria rather than combining exponents. This eliminates the delay caused by adding the exponents together. However, FIG. 3 shows that the fixed criteria 18 must be made more restrictive than Hansen's criteria, leaving a very small safe region 19. About 75% of all possible exponent combinations predict an error with Sweedler's apparatus. Thus Sweedler does not combine exponents, but compares each exponent to fixed criteria that do not vary with the type of floating point operation.

Some architectures are capable of floating point operations with three rather than just two inputs. A MULADD operation multiplies two inputs together while adding a third input. Prediction is desired for this compound floating point operation.

The IEEE-754 standard defines several formats or levels of precision. These formats also vary the number of exponent bits, which allows for a wider range of representable exponent values. For example, double-extended precision uses at least 15 exponent bits, while double precision uses 11 bits and single precision 8 exponent bits. An apparatus is desired that can perform error prediction in any precision, not just in the highest precision.

What is also desired is a more inexpensive prediction apparatus, one not requiring a separate prediction adder. The prediction apparatus ideally would be accurate in prediction, not predicting errors for a wider range of exponents than is necessary. It is also desired that the prediction apparatus be capable of handling various precisions.

SUMMARY OF THE INVENTION

Exponents are first combined together, in a way that varies with the type of floating point operation. A single intermediate exponent result is provided on an intermediate exponent bus. This intermediate exponent is adjusted upwards for any carry-out from the operation on the mantissas, or downwards for any cancellation of leading mantissa bits, to produce the final exponent result.

The intermediate exponent on the intermediate exponent bus is compared to a single criteria which is used for all types of floating point operations. Thus the compare logic may be simplified because only a single set of criteria is used for all types of operations. Alternately, the criteria may be varied depending upon the level of precision used by the operation. Because the intermediate exponent is used, separate exponent adders are not necessary for the prediction unit and the floating point unit.

A floating point processor performs a floating point operation. The floating point processor has a plurality of inputs representing numbers in a floating point format, each input in the plurality of inputs having a mantissa portion and an exponent portion. An exponent unit receives the exponent portions of the plurality of inputs, and calculates an intermediate exponent. A mantissa multiplier-adder multiplies the mantissa portions of at least two of the plurality of inputs, and produces an un-normalized output. A normalizing and rounding unit receives the un-normalized output from the mantissa multiplier-adder, and normalizes and rounds the un-normalized output to produce a normalized mantissa result. The normalizing and rounding unit determines an adjustment needed to the intermediate exponent. The adjustment needed is equivalent to a bit-position shifting for the normalizing and rounding performed on the unnormalized output. The normalizing and rounding unit outputs an adjust value indicating the adjustment needed to the intermediate exponent.

An intermediate exponent bus receives the intermediate exponent from the exponent unit and is capable of holding a single exponent. An exponent adjust unit is coupled to the intermediate exponent bus. The exponent adjust unit receives the intermediate exponent on the intermediate exponent bus, and receives from the normalizing and rounding unit the adjust value indicating the adjustment needed to the exponent. The exponent adjust unit adjusts the intermediate exponent by the adjust value received from the normalizing and rounding unit and outputs a final exponent result.

A prediction unit is coupled to the intermediate exponent bus and receives the intermediate exponent. The prediction unit compares the intermediate exponent to criteria indicating a range of exponent values that are in a safe range. The prediction unit signals a floating point error if the intermediate exponent is outside the safe range indicated by the criteria.

Thus a floating point error is predicted by comparing a single intermediate exponent to criteria that is the same for all floating point operations. Compound floating point operations may require more complex logic for combining the exponents. The more complex logic is needed to calculate the exponent for the result, so again no additional logic is needed for prediction. Only a single exponent is outputted to the intermediate exponent bus. Thus compound floating point operations may be accommodated simply with the modifications needed for the exponent combination logic.

DETAILED DESCRIPTION

Figure 1:
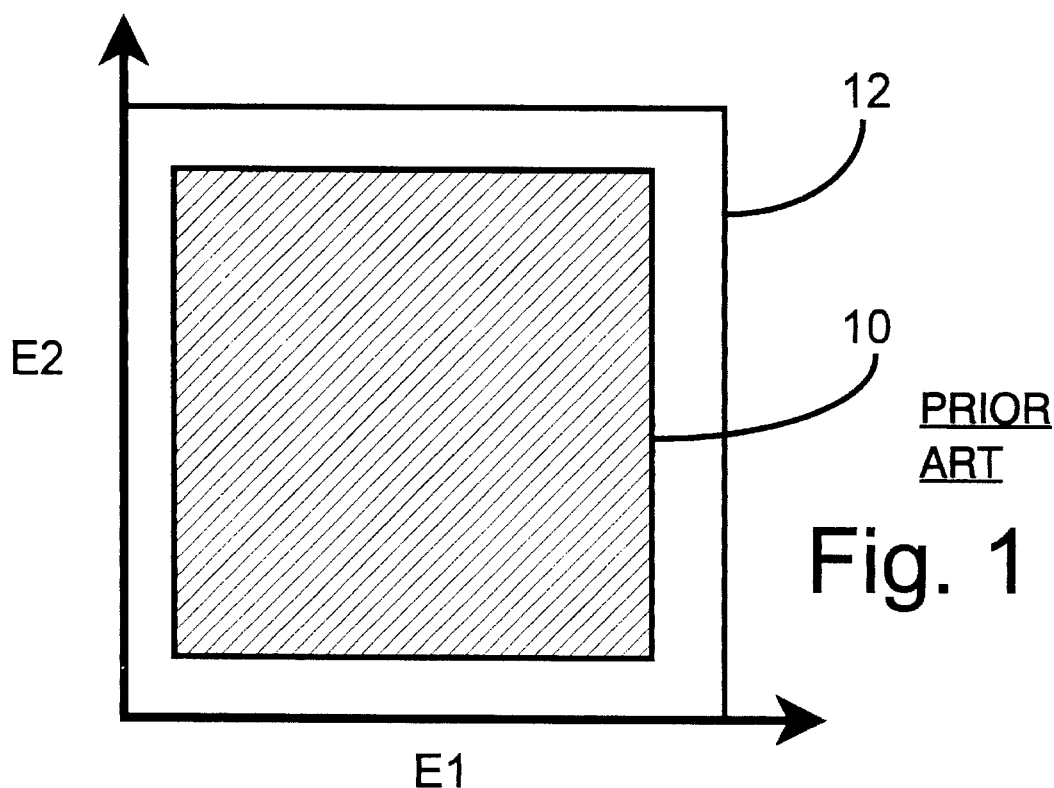
FIG. 1 is a graph of the safe region for addition (not to scale).

The present invention relates to an improvement in floating point processors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A floating point processor for use with modern pipelined processors, especially those emulating various architectures, should be capable of varying the precision yet still accurately predicting when an overflow or underflow will occur. Compound floating point operations having three inputs are also defined in some architectures. Three-input operations have often been emulated or broken up into separate two-input operations. However, prediction should occur early in the compound operation and not wait for the second or final part of the compound operation.

INTERNAL REPRESENTATION OF FLOATING POINT NUMBERS

Table 1 shows three precisions for floating point numbers. Single precision can represent a number from $2^{-126}$ to $2^{+127}$, and the unbiased exponent range is −126 to +127. The exponent bias is normally about half of the range of the unbiased exponents. This allows positive and negative exponents to be represented without a sign bit. The biased exponent, which is stored in the computer system's memory, is an unsigned binary number from one to the maximum number representable in the fixed number of bits for that precision. For example, single precision has 8 bits for the exponent, which can represent an unbiased exponent from 0 to $2^8$ or 255. Negative exponents have an unbiased value of 1 to 127, while the value 128 represents an exponent value of zero, and positive exponents range from 129 to 254. The bias value for single precision is 128, since the unbiased value 128 represents the exponent value zero.

The range of exponent values may not be the full range representable by the number of exponent bits, but may be reduced slightly. For example, single precision has 8 exponent bits, which has a representable range of 0–255. However, the range used by the IEEE-754 standard is not 0–255 but 1–254, because 0 is reserved for indicating zero and de-normalized numbers while 255 is reserved for representing infinity and not-a-number.

Double precision uses a bias of 1023, while double-extended precision uses a bias of 16,383. A larger range of exponents can be represented in these higher precisions.

TABLE 1

| Precision | # Exp Bits | Standard Exponent Ranges Unbiased Range | Bias | Biased Range |
| --- | --- | --- | --- | --- |
| Single | 8 | −126 to +127 | 127 | 1 to 254 |
| Double | 11 | −1022 to +1023 | 1023 | 1 to 2046 |
| Double-Extended | 15 | −16,382 to +16,383 | 16,383 | 1 to 32,766 |

A single bias value may be used for all precisions. A simple implementation is to use the bias for the highest precision available on a computer. The preferred embodiment supports single and double precision, but does not support double-extended precision. The double-precision bias of 1023 is thus used as the bias for both single and double precision. As shown in Table 2, the biased range for double precision will be 1 to 2046, but the biased range for single precision will be 897 to 1150, rather than 1 to 154.

TABLE 2

Internal Exxponent Ranges

| Precision | # Exp Bits | Unbiased Range | Internal Bias | Internal Biased Range |
|---|---|---|---|---|
| Single | 8 | −126 to +127 | 1023 | 897 to 1150 |
| Double | 11 | −1022 to +1023 | 1023 | 1 to 2046 |
| Double-Extended | 15 | −16,382 to +16,383 | Not Supported | Not Supported |

Figure 3:
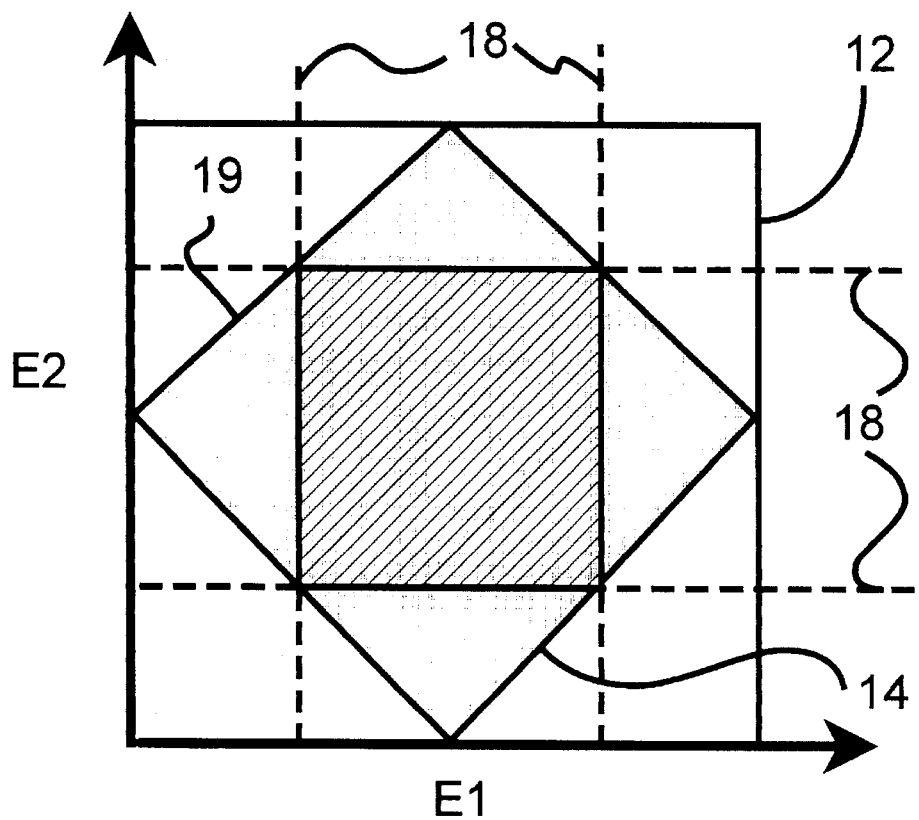
FIG. 3 is a graph of the safe region for multiply using Sweedler's apparatus (not to scale).
Figure 4:
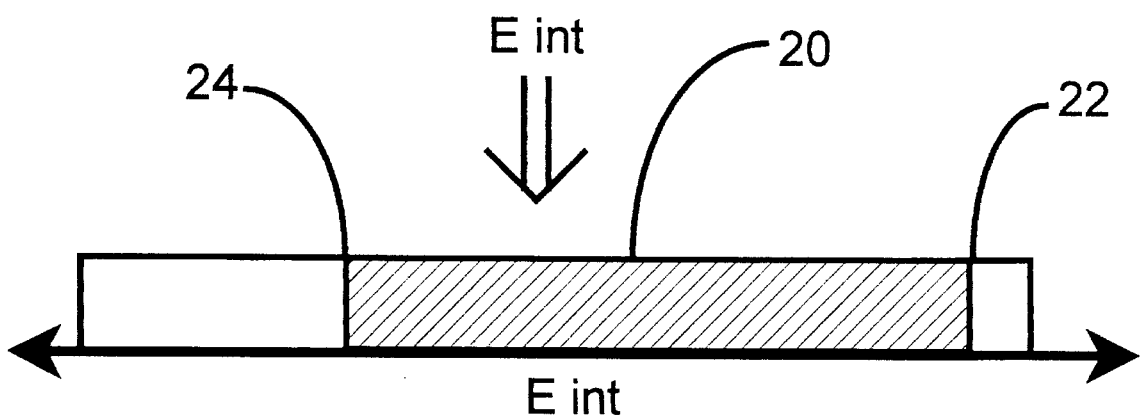
FIG. 4 is a one-dimensional graph of the safe range for the intermediate exponent (not to scale).

FIG. 4 is a graph of the one-dimensional safe region 20 between upper criteria 22, $E_{max}-y$ and lower criteria 24, $E_{min}+Z$, where y and z are guardbands to account for rounding and normalization of the mantissa. As will be explained further, guardbands y and z are not symmetrical because of the 3-operand MULADD operation and the 2-operand ADD operation. A single intermediate exponent, rather than two or more exponents, is compared to criteria 22, 24. This single exponent value is output from an exponent prediction unit. For two input multiply and divide operations, the safe region will have similar coverage as Hansen's safe region for multiply/divide 14 shown in FIG. 2, rather than the reduced coverage shown in FIG. 3 for Sweedler's apparatus. However, the single set of criteria 22, 24 can also be used for addition and subtraction operations.

The guardbands required to ensure that a floating point error will not occur for any floating point operation depend upon the amount that the exponent can be adjusted. This amount of adjustment is the adjustment required from the intermediate exponent to the final exponent. The amount of adjustment is determined by the shifting performed in the mantissa arithmetic, and the shifting needed to round and normalize the result.

The upper guardband is two. Two carry-outs can occur in the mantissa arithmetic, or just one mantissa carry-out and a second carry-out in rounding. This upper guardband does not vary with the type of floating point operation. Left-shifting during normalizing will not increase the needed guardband, because this can only decrease the exponent. For example, the un-normalized number 0.000101 is normalized to 1.010000 by shifting to the left 4 places, which requires that the exponent be decreased by 4. Thus the upper criteria is two less than the maximum bias, or 1148 for single precision and 2044 for double precision, for the preferred embodiment using an internal bias of 1023.

The lower guardband must be larger because of normalizing three-operand results. A multiply-add operation first multiplies two operands together, then adds this result to a third operand. The un-normalized result could have a large number of leading zeros, requiring a large shift and a large adjustment to the exponent. For example, the un-normalized number 0.0000001101 would be normalized to 1.10100000000 by shifting 7 places, and the exponent would have to be decreased by 7. The maximum change to the exponent is approximately equal to the number of significant bits in the mantissa arithmetic unit. In the preferred embodiment, the lower guardband is 48 for single precision and 106 for double precision. The three-operand MULADD operation has twice as many significant bits in the mantissa than a simple 2-operand ADD because the multiply produces an intermediate result having the double-width of mantissa bits.

APPARATUS

Figure 5:
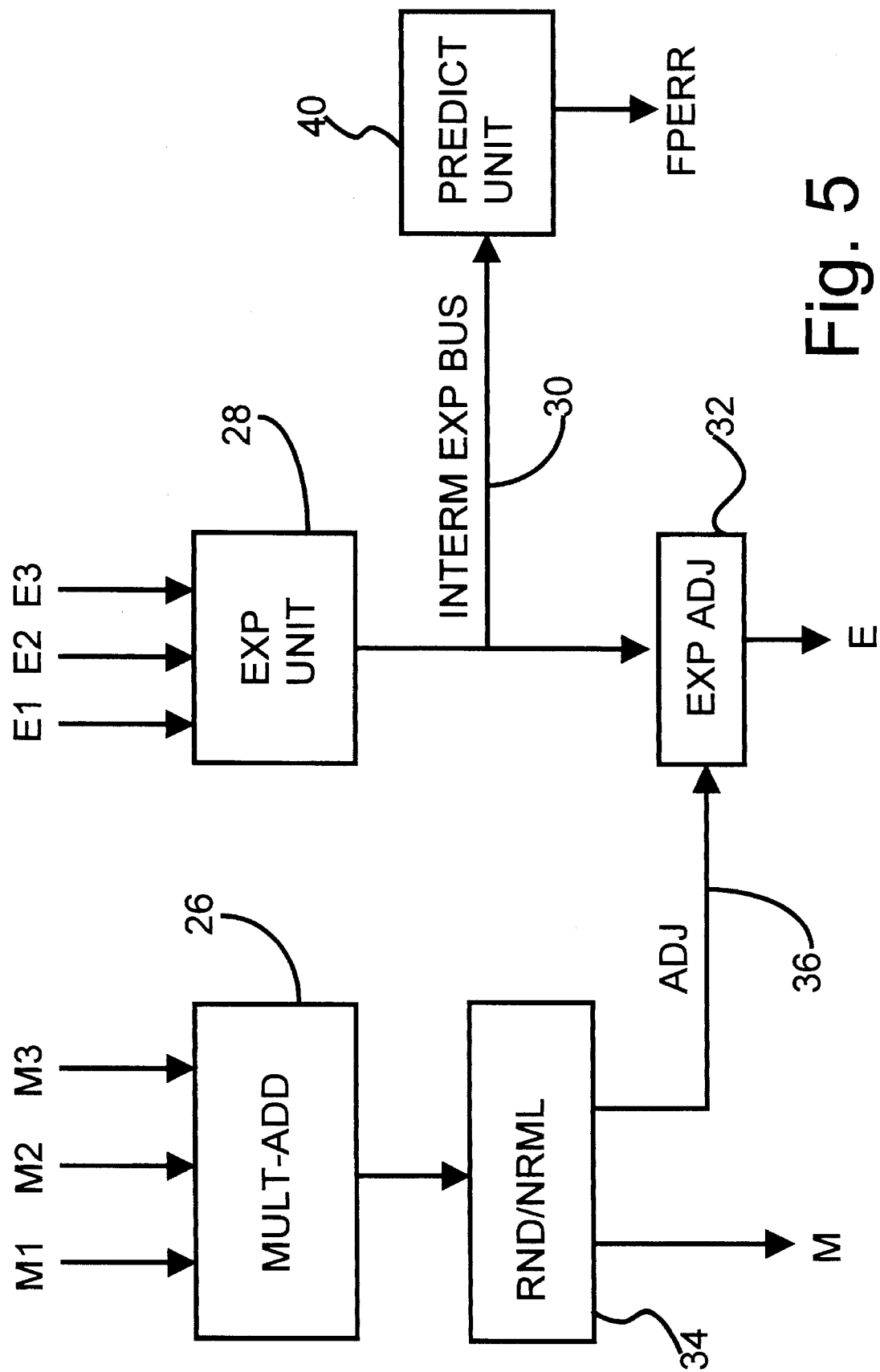
FIG. 5 is a floating point processor.

FIG. 5 is a block diagram of a floating point processor. Up to three floating point numbers comprised of fractional parts or mantissas M1, M2, M3 and exponents E1, E2, E3 are input to the floating point processor. Mantissas M1, M2, M3 are input to a mantissa multiplier-adder 26, which can preferably perform multiplication, division, addition, subtraction and unary operations such as rounding, sign change, or format conversion. An exponent unit 28 receives the input exponents E1, E2, E3 and generates an intermediate exponent value which is output on intermediate exponent bus 30. The intermediate exponent value on bus 30 is adjusted by exponent adjust unit 32 to produce the final exponent result E. Exponent adjust unit 32 is controlled by rounding unit 34, which normalizes and rounds the mantissa result output from mantissa multiplier-adder 26. If the mantissa result from mantissa multiplier-adder 26 must be shifted to normalize the mantissa, then the exponent must also be adjusted. Rounding unit 34 signals an adjust amount to exponent adjust unit 32 over adjust bus 36.

Prediction of a possible overflow or underflow is determined by prediction unit 40. Prediction unit 40 receives the intermediate exponent from intermediate exponent bus 30. The intermediate exponent on bus 30 may not be the final exponent result since any adjustment to the exponent needed by an overflow or underflow in mantissa arithmetic has not yet occurred. While a delay is incurred in generating the intermediate exponent result, this delay is much less than the delay generating the mantissa in mantissa multiplier-adder 26, and in generating the adjust amount from rounding unit 34. Thus the intermediate exponent on intermediate exponent bus 30 is available much sooner than the final exponent E from exponent adjust unit 32.

Prediction unit 40 compares the single exponent value on the intermediate exponent bus 30 to the single set of criteria, as shown in FIG. 4. If the single exponent value falls outside of the criteria and error-detection is enabled, a floating point error is possible, and a possible error is signaled on the FPERR line. The FPERR signal will halt other instructions in the processor's pipeline until the floating point operation has completed and it can be determined if an error actually occurred.

Figure 6:
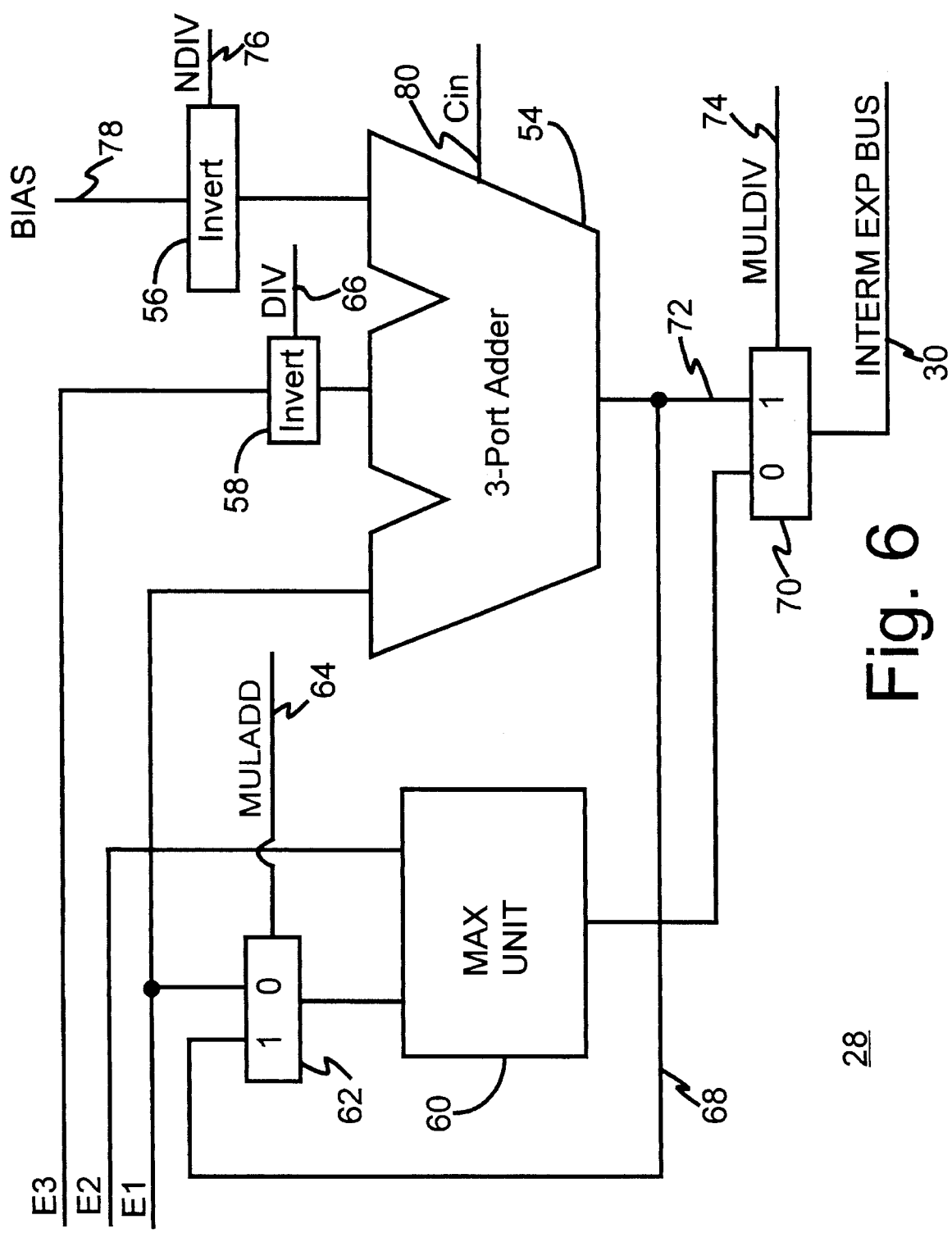
FIG. 6 an exponent unit with three exponent inputs.

FIG. 6 is a block diagram of exponent unit 28, which generates the intermediate exponent that is output on intermediate exponent bus 30. The three exponents E1, E2, E3 are input to exponent unit 28. Should the floating point operation only require 2 exponents, E2 or E3 will be ignored. Exponent unit 28 supports addition, subtraction, multiply, and divide as two-input operations, and compound operations having three inputs. Three-input compound operations include multiply-add, MULADD, which multiplies the first and third inputs and adds the result to the second input (for the mantissas, the operation is M1*M3+M2). Other three-input compound operations include multiply-subtract, MULSUB, which multiplies the first and third inputs and subtracts the second input, (the mantissa operation is M1*M3−M2), negative-multiply-add, NMULADD, and negative multiply-subtract, which subtracts the product of the first and third inputs and add the second input (NMULADD) or subtracts the second input (NMULSUB). The mantissa operation for NMULADD is −(M1*M3+M2) while the mantissa operation for NMULSUB is −(M1*M3−M2). Also supported are unary operations, such as inversion and round to single precision, which have only a single input, E2/M2. For the different operations the intermediate exponent value will be as shown in Table 3.

TABLE 3

Intermediate Exponent Calculation

| Operation | Intermediate Exponent Value |
| --- | --- |
| Add | MAX (E1, E2) |
| Subtract | MAX (E1, E2) |
| Multiply | E1 + E3 − Bias |
| Divide | E1 − E3 + Bias |
| MULADD | MAX (E1 + E3 − Bias, E2) |
| MULSUB | MAX (E1 + E3 − Bias, E2) |
| NMULADD | MAX (E1 + E3 − Bias, E2) |
| NMULSUB | MAX (E1 + E3 − Bias, E2) |
| Unary | E2 |

The apparatus of FIG. 6 performs the calculation of the single intermediate exponent value, as defined in Table 3. The exponent unit 28 includes a maximum unit 60, which outputs the maximum or larger value of the input from mux 62 and E2. The output from maximum unit 60 is input to mux 70, which selects this input for all operations except multiply or divide operations, which cause a high signal to appear on control signal 74. The output of mux 70 is the intermediate exponent placed on the intermediate exponent bus 30. The other input to mux 70 is selected for multiply or divide operations, and is the output of three-port adder 54. Three-port adder 54 receives the E1 input on its first input port, while the second and third input ports of three-port adder 54 are coupled to the outputs of inversion units 56, 58. Inversion unit 58 selectively inverts E3 when control signal 66 indicates a divide operation is being performed, while Inversion unit 56 selectively inverts a bias input 78 when control signal 76 indicates a divide operation is not being performed. Since inversion units 56, 58 perform a simple bit-wise inversion, yielding the one's complement of their inputs, a value of one ("1") must be added in to convert the one's complement to two's complement. Adding the two's complement is equivalent to subtracting the number represented by the input. Since control signals 66, 76 are opposites of each other, only one of these two control signals will be active at any one time, and only one of the inversion units 56, 58 will invert its input. Thus there can only be one input inverted and just one correction term is needed to convert to two's complement. This correction term, a value of one, is input to the three-port adder 54 on its carry-in input 80.

Bias input 78 is the exponent bias which is normally about half of the range of the unbiased exponents. This allows positive and negative exponents to be represented without a sign bit. The biased exponent, which is stored in the computer system's memory, is an unsigned binary number from zero to the maximum number representable in the fixed number of bits for that precision. In a simple example, single precision has 8 bits for the exponent, which can represent an unbiased exponent from 0 to $2^8$ or 255. However, negative exponents have an unbiased value of 1 to 127, while the value 128 represents an exponent value of zero, and positive exponents range from 129 to 254. The range of exponent values may not be the full range representable by the number of exponent bits, but may be reduced slightly. For example, single precision has 8 exponent bits, which has a representable range of 1–254. The bias value for single precision would be 128, since the unbiased value 128 represents the exponent value zero.

Three-port adders are well-known by those of skill in the art, and can be implemented in a variety of ways, such as with a first stage of 3-input carry-save adder cells producing a sum and a carry output for each bit which are input to a second stage of carry-propagate adder cells, which generates the final sum of the three inputs.

Thus for multiply operations, E1 will be added to E3, which is not inverted, and the one's complement (bit-wise inversion) of the bias. The carry-in is set to one, to account for conversion of the inverted bias to two's complement. The output of the three-port adder is E1+E3−Bias. For divide operations, E3 is inverted while Bias is not, and the carry-in is still set to one. The three-port adder outputs E1−E3+Bias for divide.

Addition, subtraction, and unary operations do not use the three-port adder 54. The maximum unit 60 is used instead to select the larger exponent of its inputs. For all operations except MULADD, mux 62 selects E1 and E2 for input to maximum unit 60. Thus the larger of E1 or E2 is output to mux 70, which drives the intermediate exponent bus 30 with this value for all operations except multiply and divide. For unary operations, the single exponent value is merely passed through maximum unit 60 to its output.

MULADD is a compound floating point operation having three inputs. E1 and E3 are added together in three-port adder 54, which has control signals 66, 76 set for multiply so that the output of three-port adder 54 is E1+E3−Bias. The carry-in input 80 is also set to one. The output of three-port adder is prevented from being driven to the intermediate exponent bus 30 by mux 70, which has control signal 74 MULDIV set to zero. The output of the three-port adder is however sent along bypass bus 68 to mux 62 and inputted as the first input to maximum unit 60. Control signal 64, MULADD, is set to a one, causing mux 62 to select bypass bus 68 from the three-port adder. The second exponent input E2 is also inputted to maximum unit 60. The larger of E2 or E1+E3−Bias, the output on bypass bus 68 from the three-port adder, is selected by maximum unit 60 and sent to mux 70 for output to the intermediate exponent bus 30. Control signal 74, MULDIV, is zero to select the maximum unit's output. The other three-input compound operations, MULSUB, NMULADD, and NMULSUB, cause control signal 64, MULADD to be active and signal 74 MULDIV to be zero, so that all of these compound operations are processed by exponent unit 28 in the same manner.

Figure 7:
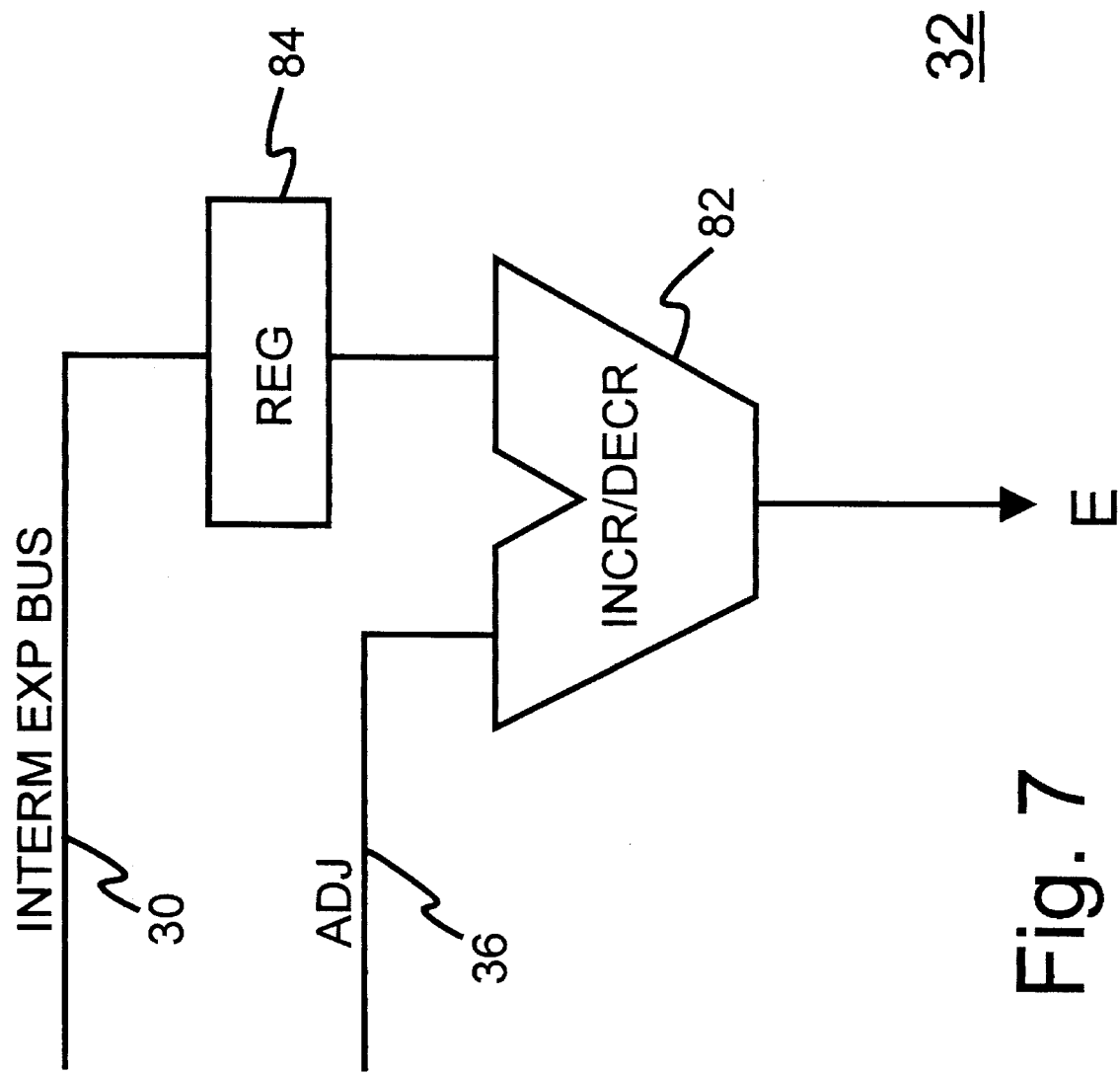
FIG. 7 is an exponent adjust unit.

FIG. 7 is a diagram of the exponent adjust unit 32. Exponent adjust unit 32 receives the intermediate exponent on the intermediate exponent bus 30, which has not been adjusted for any shifting of the mantissa. The intermediate exponent may need to be stored in register 84 for several clock periods since mantissa multiplier-adder 26 of FIG. 5 requires several clock periods to generate its result. In some embodiments register 84 may not be necessary. The intermediate exponent stored in register 84 is inputted as an operand input to incrementer/decrementer 82, which also receives the adjust amount from the rounding unit 34 of FIG. 5. The adjust amount is received over adjust bus 36, and contains information on the amount the intermediate exponent must be incremented or decremented to achieve the correct exponent result E. The adjust amount may be a positive or a negative number, and may have a magnitude greater than one, or it may be zero. It depends upon how many bit-positions the mantissa result was shifted by to be normalized, and if any carry-out occurred during the arithmetic on the mantissas in mantissa multiplier-adder 26 or in rounding unit 34. In the preferred embodiment, the adjust amount can be from +2 to −48 when single-precision operands are used, and +2 to −106 when double-precision operands are used.

Figure 8:
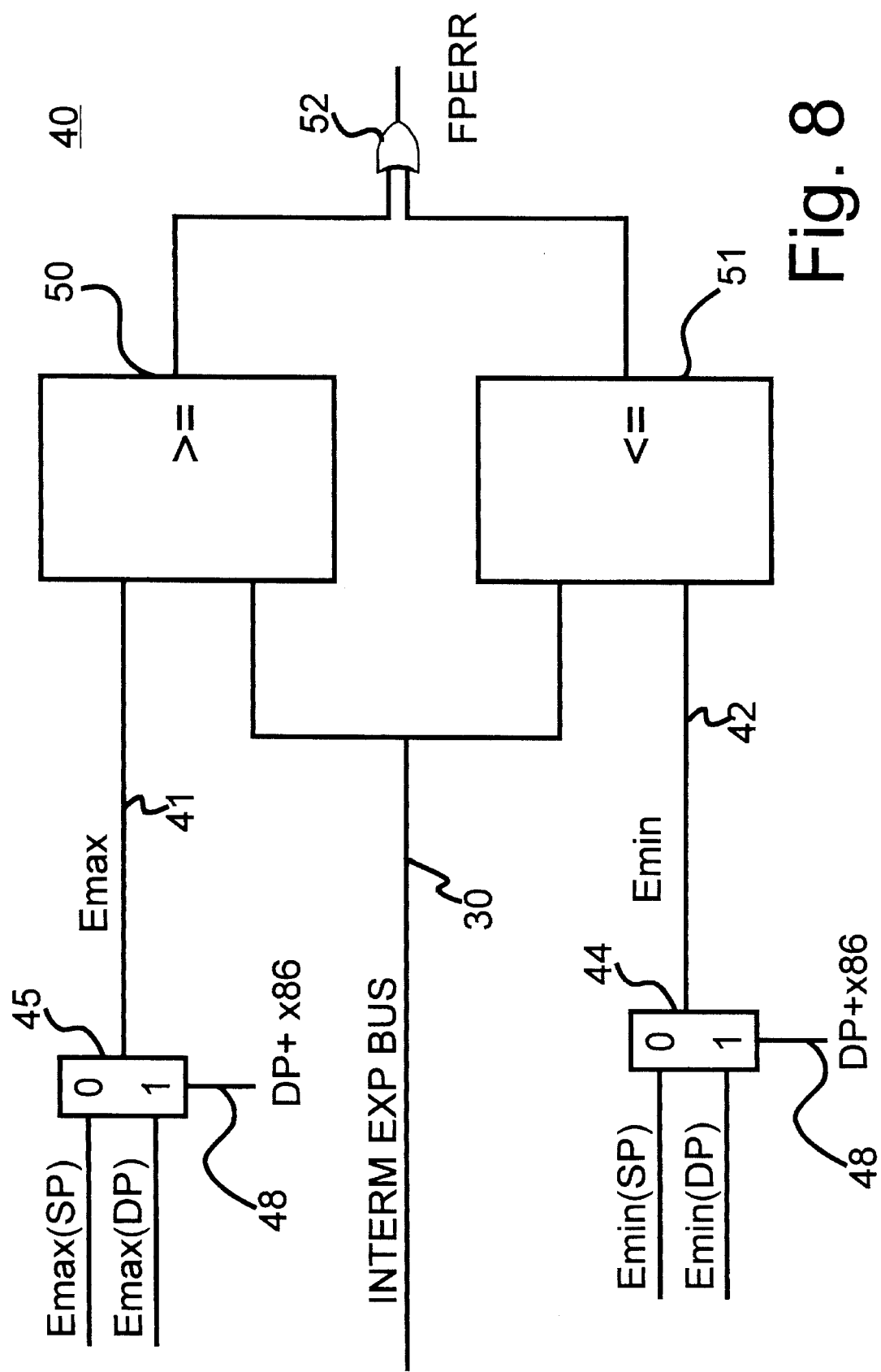
FIG. 8 is a floating point error prediction unit with variable precision using a single intermediate exponent.

FIG. 8 shows the prediction unit 40. The single intermediate exponent value is inputted over intermediate exponent bus 30. Logic blocks 50, 51 receive the intermediate exponent and compare it to a single set of criteria. Logic block 50 outputs an error signal if the intermediate exponent is equal to or exceeds the maximum criteria 41. Likewise, logic block 51 outputs an error signal if the intermediate exponent is less than or equal to the minimum criteria 42. The error signals outputted from logic blocks 50, 51 are OR'ed together by OR gate 52, producing a floating point error signal, FPERR, which indicates that an error could occur. Logic blocks 50, 51 may be implemented in many ways by persons of skill in the art. Criteria 41, 42 may be adjusted so that logic blocks 50, 51 detect greater than or less than, instead of greater than or equal to and less than or equal to. Similarly, the polarity of the output signals may be altered by those of skill in the art while still signaling an error when necessary. Gates may be added to disable the output of logic block 50 when overflow errors are disabled, while gating on the output of logic block 51 could be used to selectively disable underflow errors.

The maximum criteria 41 varies for the degree of precision for the particular operation and inputs currently being processed. Signal 48 will be a one when double precision is used and zero when single precision is used. Mux 45 will select either the single precision maximum criteria Emax(SP) or the double precision maximum criteria, Emax(DP).in response to signal 48.

Minimum criteria 42 is either the single-precision minimum criteria, Emin(SP), selected by mux 44 when signal 48 is low, or the double-precision minimum criteria, Emin(DP), selected by mux 44 when signal 48 is high.

For emulation of RISC architectures, the prediction unit 40 selects the proper criteria depending upon the precision selected. The precision selected may be determined by the precision of the inputs, by the mode the processor is running in, by the instruction opcode or information contained in the instruction word, or by other means. The prediction unit 40 of the present invention is highly adaptable, capable of emulating various degrees of precision. When emulation of the CISC x86 architecture, the degree of precision must be forced to the highest precision (but not greater than extended) implemented in the embodiment regardless of the precision of the inputs. Thus control signal 48 will be high or active when emulating x86 floating point operations, causing mux 45 to select the double precision maximum criteria, Emax(DP). Likewise, mux 44 will select the double precision minimum criteria, Emin(DP).

Note that the criteria do not change for different types of floating point operations. Because the intermediate exponent is first calculated, a single set of criteria may be used for all floating point operations. This simplifies the prediction unit 40. The criteria are only changed for different degrees of precision desired for emulation purposes.

The internal values of criteria Emin and Emax are the minimum unbiased exponent value, one, with a guardband of 48 for single precision and 106 for double precision. These guardband values are determined by the maximum shifting possible in the multiplier-adder 26 and the normalizing and rounding unit 34. Thus the minimum criteria Emin(SP) is set to 1148 while Emin(DP) is set to 2044. The minimum criteria is calculated as the minimum unbiased exponent+bias+guardband=−126+1023+48=945 for single precision or −1022+1023+106=107 for double precision. The maximum criteria Emax is the maximum representable exponent with a guardband of 2. The maximum exponent representable depends upon the degree of precision which sets the number of exponent bits. For single precision, Emax(SP) is the maximum unbiased exponent+bias+guardband=127+1023−2=1148. For double precision, Emax(DP) is the maximum unbiased exponent+bias+guardband=1023+1023−2=2044.

TABLE 4

Intermediate Exponent Calculation of Safe Range

| Precision | # Exp Bits | Emin | Emax | Internal Representation Emin | Emax |
|---|---|---|---|---|---|
| Single | 8 | 48 | 252 | 945 | 1148 |
| Double | 11 | 106 | 2045 | 107 | 2044 |
| Double-Extended | 15 | 106 | 32754 | N/A | N/A |

ADVANTAGES OVER THE PRIOR ART

Hansen, in U.S. Pat. No. 4,879,676, combines exponents, but then compares the combined result to criteria that vary with the type of floating point operation, such as addition or division. Sweedler, U.S. Pat. No. 5,257,216, does not combine exponents, but instead compares each exponent to fixed criteria that do not vary with the type of floating point operation. Thus Hansen compares a combination of the exponents to variable criteria, while Sweedler compares each exponent, without combination, to fixed criteria. Each approach has drawbacks that the present invention solves.

Hansen suffers from having to select from multiple criteria depending upon the type of floating point operation being performed. This selection of criteria must be done on a cycle-by-cycle basis, as each instruction in the pipeline may use a different type of floating point operation. The selection of criteria must be rapid, since prediction must occur in the early pipestages so that more recent instructions in the pipeline can be stalled if an exception is predicted. The type of floating point operation must be quickly decoded and sent to the criteria selection logic.

The present invention does not have to select between multiple criteria, since fixed criteria are used that do not depend upon the type of floating point operation. Although in the present invention criteria can be changed when a different precision is used, precision is infrequently changed while the type of calculation often changes with practically every instruction. Thus the invention, by using fixed criteria, solves Hansen's performance problem caused by having to select between multiple criteria for different types of floating point calculations.

Sweedler has higher performance than Hansen, since Sweedler does not combine exponents. However, Sweedler achieves higher performance at the cost of poor prediction accuracy. Sweedler's prediction is inaccurate especially for multiplication and division. Combining exponents before comparing to the criteria is critical for accurate prediction. Sweedler does not first combine the exponents.

Figure 2:
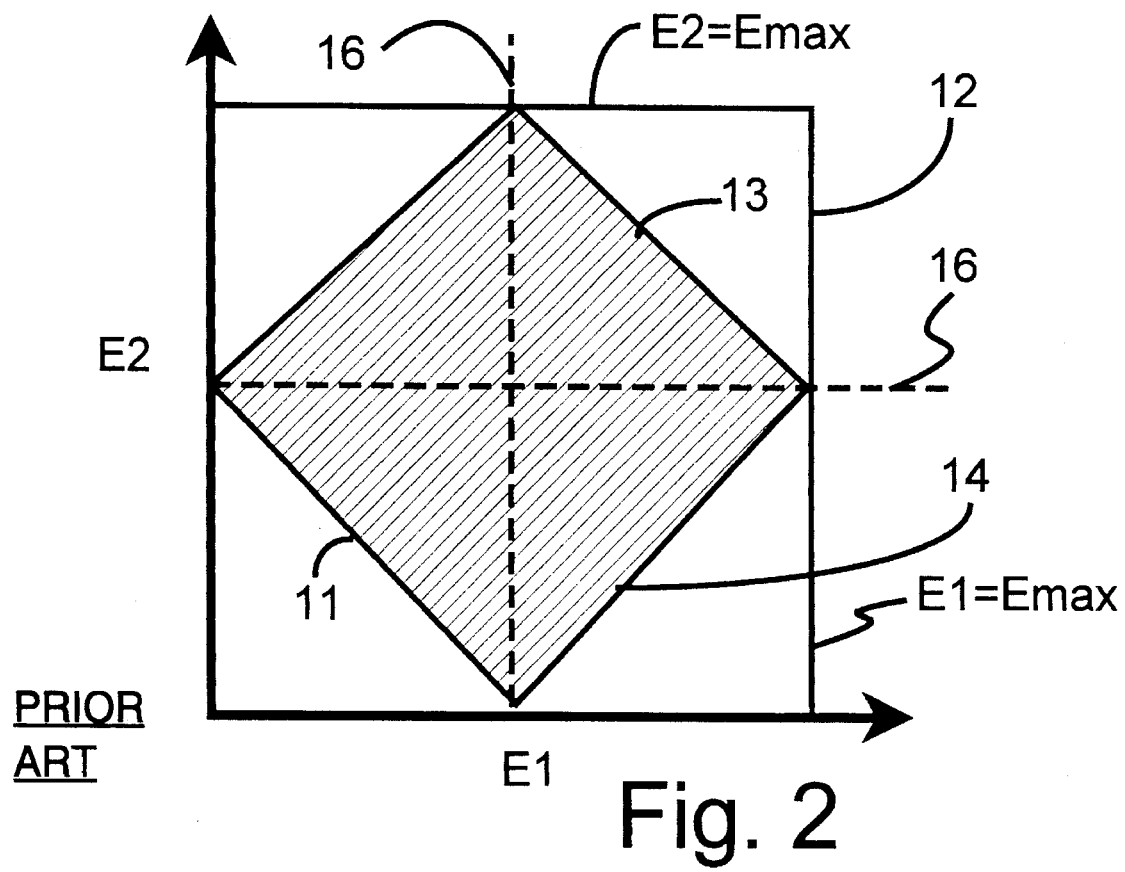
FIG. 2 is a graph of the safe region for multiply using Hansen's apparatus (not to scale).

Sweedler throws away a vast area of the coordinate space for multiplication and division, as a comparison of FIG. 2 (Hansen) to FIG. 3 (Sweedler) shows. Hansen correctly predicts exceptions only for exponent pairs outside of the diamond-shaped safe region 14 of FIG. 2. Sweedler's safe region 19 is a rectangle entirely within Hansen's diamond-shaped safe region 14, as FIG. 3 illustrates. Sweedler's safe region is about half the area of Hansen's safe region.

Because Sweedler does not combine exponents, he is limited to comparing each exponent to a fixed value. This means than Sweedler's safe region 19 must be rectangular in shape, as only horizontal or vertical lines represent a comparison of a single exponent to a fixed value (such as x<=5). Hansen's safe region 14 is diamond-shaped, since combining the exponents first allows for sloped lines bordering his safe region 14 (such as x+y<=5).

The present inventors have realized that accuracy of prediction is paramount. Thus exponents are combined before comparison to criteria. This gives the present invention accurate predication as with Hansen's apparatus. However, the present invention uses fixed criteria that do not vary with the type of floating point calculation. This increases the performance and speed of the prediction. Comparing a combination of exponents to fixed criteria achieves prediction only slightly less accurate than Hansen, but much more accurate than Sweedler. Graphically, the present invention's safe region is a diamond-shaped region only slightly smaller than Hansen's safe region 14.

The invention surprisingly requires little additional hardware, since the exponents must be combined to generate the final result of the calculation. The prediction apparatus can simply use the intermediate exponent before rounding and normalizing. The prediction unit is also simplified relative to Hansen since selection between multiple criteria for different floating point calculations is not required.

ALTERNATE EMBODIMENTS

Several other embodiments are contemplated by the inventors. For example, many implementations are possible using logic gates or cells for the three-port adder, the prediction unit, or the exponent unit. The adjust amount from the rounding unit 34 of FIG. 5 could be inputted to incrementer/decrementer 82 on a carry-in input rather than a separate port input. Support could be added for double-extended precision by changing the internal bias to the bias for the double-extended precision, and by adding another two muxes in the prediction unit 40. The additional muxes would select Emax(XP) and Emin(XP) when double-extended precision is used, or when x86 CISC mode is used.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A floating point processor for performing a floating point operation, the floating point processor comprising:

a plurality of inputs representing numbers in a floating point format, each input in the plurality of inputs having a mantissa portion and an exponent portion;

an exponent unit, receiving the exponent portions of the plurality of inputs, the exponent unit calculating an intermediate exponent;

a multiplier for multiplying the mantissa portions of at least two of the plurality of inputs, the multiplier producing an un-normalized output;

a normalizing and rounding unit, receiving the un-normalized output from the multiplier, the normalizing and rounding unit normalizing and rounding the un-normalized output to produce a normalized mantissa result, the normalizing and rounding unit determining an adjustment needed to the intermediate exponent, the adjustment needed being equivalent to a bit-position shifting for the normalizing and rounding performed on the un-normalized output, the normalizing and rounding unit outputting an adjust value indicating the adjustment needed to the intermediate exponent;

an intermediate exponent bus, receiving the intermediate exponent from the exponent unit, the intermediate exponent bus capable of holding a single exponent;

an exponent adjust unit, coupled to the intermediate exponent bus, the exponent adjust unit receiving the intermediate exponent on the intermediate exponent bus, the exponent unit receiving from the normalizing and rounding unit the adjust value indicating the adjustment needed to the intermediate exponent, the exponent adjust unit adjusting the intermediate exponent by the adjust value received from the normalizing and rounding unit, exponent adjust unit outputting a final exponent result; and a prediction unit, coupled to the intermediate exponent bus and receiving the intermediate exponent, the prediction unit comparing the intermediate exponent to criteria indicating a range of exponent values that are in a safe range, the prediction unit signaling a floating point error if the intermediate exponent is outside the safe range indicated by the criteria, whereby a floating point error is predicted by comparing a single intermediate exponent to criteria that is the same for all floating point operations.

2. The floating point processor of claim 1 wherein the criteria comprise a minimum criteria and a maximum criteria, the minimum criteria and the maximum criteria being independent of the floating point operation being performed.

3. The floating point processor of claim 2 wherein the exponent portion of the plurality of inputs consists of n binary bits, the minimum criteria having a value of 107, the maximum criteria having a value of 2044.

4. The floating point processor of claim 2 wherein the exponent portion of the plurality of inputs consists of n binary bits, the minimum criteria having a value equal to double a number of significant bits in the mantissa portion plus x, where x is selected from the group consisting of 1 or 2, the maximum criteria having a value of $2^n-m$, where m is selected from the group consisting of 1 or 2.

5. The floating point processor of claim 2 wherein:

the mantissa portion of each of the plurality of inputs has a first number of binary bits and the exponent portion of each of the plurality of inputs has a second number of binary bits;

the plurality of inputs have variable precision, a degree of precision determined by the first number of binary bits in the mantissa portion and the second number of binary bits in the exponent portion; and the maximum criteria being constant for any particular degree of precision but varying with the degree of precision, the minimum criteria being constant for any particular degree of precision but varying with the degree of precision.

6. The floating point processor of claim 2 wherein the plurality of inputs comprises three inputs.

7. The floating point processor of claim 1 wherein the adjust value indicating the adjustment needed to the intermediate exponent is less than or equal to the number of bit-positions in the mantissa.

8. The floating point processor of claim 1 wherein the exponent unit comprises:

a first exponent input receiving the exponent portion of a first input of the plurality of inputs;

a second exponent input receiving the exponent portion of a second input of the plurality of inputs;

means for selecting the maximum of a first input and a second input, the means for selecting producing a maximum output, the maximum output receiving the first input if the first input has a larger value than the second input, the maximum output receiving the second input if the second input has a larger value than the first input;

first means for coupling the first exponent input to the first input of the means for selecting;

second means for coupling the second exponent input to the second input of the means for selecting;

adding means, receiving the first input and the second input and a bias, for outputting a first sum when the floating point processor is executing a multiply floating point operation, the first sum being a sum of the first input, the second input, and a two's complement of the bias; and multiplexer means, receiving the first sum from the adding means and receiving the maximum output from the means for selecting the maximum, the multiplexer means for outputting to the intermediate exponent bus the first sum when a multiply floating point operation is being executed by the floating point processor, the multiplexer means outputting the maximum output to the intermediate exponent bus when a unary, addition, or subtraction floating point operation is being executed by the floating point processor.

9. The floating point processor of claim 8 wherein:

the adding means outputs a second sum when the floating point processor is executing a divide floating point operation, the second sum being a sum of the first input, a two's complement of the second input, and the bias; and the multiplexer means receives the second sum from the adding means, the multiplexer means outputting to the intermediate exponent bus the second sum when the divide floating point operation is being executed by the floating point processor.

10. The floating point processor of claim 8 further comprising:

a third exponent input receiving the exponent portion of a third input of the plurality of inputs; and wherein the adding means outputs the first sum when the floating point processor is executing a compound floating point operation, the first means for coupling receives the first sum from the adding means, the first means coupling the first sum to the first input of the means for selecting when the floating point processor is executing a compound floating point operation;

the second means for coupling receives the third exponent input, the second means coupling the third exponent input to the second input of the means for selecting when the floating point processor is executing a compound floating point operation; and the multiplexer means outputting to the intermediate exponent bus the first sum when the floating point processor is executing a compound floating point operation, whereby the exponent unit outputs a combination of the three exponent inputs to the intermediate exponent bus when the floating point processor is executing a compound floating point operation.

11. The floating point processor of claim 8 wherein the adding means comprises a three-port adder.

12. The floating point processor of claim 8 wherein the exponent portion of the plurality of inputs consists of n binary bits, and wherein the bias has a numerical value about half of $2^n$.

13. The floating point processor of claim 12 wherein n is 8 for single precision, 11 for double precision, and 15 for double-extended precision.

14. The floating point processor of claim 1 wherein the exponent adjust unit comprises:

an incrementer/decrementer, the incrementer/decrementer receiving the intermediate exponent from the intermediate exponent bus, the incrementer/decrementer receiving from the normalizing and rounding unit the adjust value indicating the adjustment needed to the intermediate exponent, the incrementer/decrementer adding the adjust value received from the normalizing and rounding unit to the intermediate exponent, the incrementer/decrementer outputting the final exponent result.

15. The floating point processor of claim 1 wherein the floating point processor stalls execution of a next instruction after an instruction causing execution of the floating point operation when the prediction unit signals a floating point error when the intermediate exponent is outside the safe range indicated by the criteria.

16. A method of executing a floating point operation and predicting a possibility of a floating point error in a floating point processor, the method comprising the steps of: calculating an intermediate exponent from a plurality of exponent portions input to the floating point processor, the intermediate exponent being a single exponent value;

predicting an error if the intermediate exponent is outside of a safe region bounded by a minimum criteria and a maximum criteria, the minimum criteria being fixed for all types of floating point operations but variable for the degrees of precision of the plurality of exponent portions, the maximum criteria being fixed for all types of floating point operations but variable for the degrees of precision of the plurality of exponent portions;

performing a floating point operation on a plurality of mantissa portions input to the floating point processor, producing an un-normalized mantissa;

normalizing the un-normalized mantissa by shifting the un-normalized mantissa a variable number of binary bit-positions, producing a final mantissa result; and adjusting the intermediate exponent by adding the variable number to the intermediate exponent, producing a final exponent result.

17. The method of claim 16 further comprising the step of halting other operations in a processor if an error is predicted.

* * * * *